(No Model.)
C. F. BRUSH.
COMMUTATOR COLLECTOR OR BLOCK FOR DYNAMO ELECTRIC MACHINES.
No. 428,743. Patented May 27, 1890.
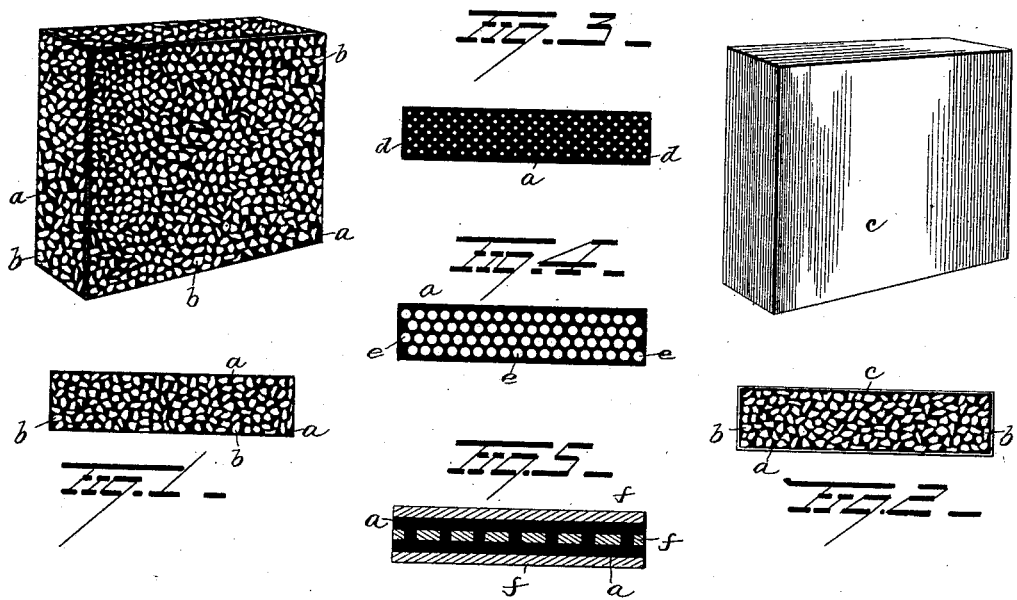
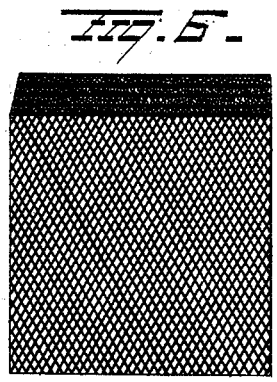
Witnesses
Inventor
Charles F. Brush.
By his Attorneys

UNITED STATES PATENT OFFICE.

CHARLES F. BRUSH, OF CLEVELAND, OHIO.

COMMUTATOR COLLECTOR OR BLOCK FOR DYNAMO-ELECTRIC MACHINES.

SPECIFICATION forming part of Letters Patent No. 428,743, dated May 27, 1890.

Application filed November 22, 1889. Serial No. 331,198. (No model.)

*To all whom it may concern:*

Be it known that I, CHARLES F. BRUSH, a resident of Cleveland, in the county of Cuyahoga and State of Ohio, have invented certain new and useful Improvements in Commutator Current Collectors or Blocks for Dynamo-Electric Machines or Electric Motors; and I do hereby declare the following to be a full, clear, and exact description of the invention, such as will enable others skilled in the art to which it appertains to make and use the same.

My invention relates to an improvement in commutator current collectors or blocks for dynamo-electric machines or electric motors.

Attempts have been made to substitute current collectors or blocks made of carbon or carbon and graphite for the copper brushes commonly used; but collectors so made were found objectionable in use owing to the low electrical conductivity of the carbon, the excessive heating of the collectors, and the undue wearing away of the commutator-segments.

The object of my invention is to provide a commutator current collector or block which will be capable of self-lubrication, whereby the wearing of the commutator-segments will be reduced to a minimum; further, to provide a collector or block of such material or materials that it shall possess such a high electrical conductivity and also a capacity for insuring at all times an intimate and extended contact with the commutator that excessive heating of the collector or block shall be obviated.

With these ends in view my invention consists in a commutator current collector or block consisting of graphite or plumbago intimately connected and combined with metal of good electrical conductivity.

The invention further consists in a commutator collector or block composed of graphite and metal molded into the desired form.

The invention further consists in a commutator block or collector made of graphite and finely-divided metal distributed throughout its mass.

It further consists in a commutator current-collector composed of graphite, having finely-divided copper distributed throughout its mass.

It further consists in certain other features of improvement and invention, as will be hereinafter described, and pointed out in the claims.

In the accompanying drawings, Figure 1 represents a commutator current collector or block composed of graphite having finely-divided metal distributed throughout its mass. Fig. 2 shows the collector or block provided with an electroplated coating. Figs. 3, 4, 5, and 6 illustrate modifications.

In the manufacture of commutator current collectors or blocks I take finely-divided or pulverized graphite and finely-divided or pulverized suboxide of copper, together with a sufficient quantity of pitch or other suitable hydrocarbon, which serves as a binder, and, after thoroughly mixing the mass, mold it in any desired shape or form by placing the mixture in a suitable mold and subjecting it while in a heated state to great pressure, so as to impart the desired density and hardness to the completed article and insure an intimate union of the materials of which it is composed. The article after being molded is packed in sand or other suitable material and baked a sufficient length of time to render it hard and suitable for the purpose intended.

The operation of baking the collectors or blocks serves to reduce the suboxide of copper to metallic copper, which, being in intimate contact with the graphite and distributed throughout its mass, forms a good electrical conductor, and thus prevents the block from becoming excessively heated when in use. The process of baking operates to render the block slightly porous and exposes to the action of the atmosphere particles of metal located at or near the surface of the block. To solidify the block and protect the metal particles so exposed, I submerge the block after baking in a hot bath of paraffine or equivalent material, which serves to fill the pores, expel the air or any moisture contained therein, and thoroughly to coat and protect the surface of the block. The relative proportions of the suboxide of copper and graphite which I have found well suited for the purpose are seventy-five per cent. of suboxide of copper, ten per cent. of graphite, and fifteen per cent. of pitch or other equivalent binding material, although these proportions may be widely varied and still insure the production of a greatly improved article.

Instead of using suboxide of copper I may employ other metallic oxides; or copper or other suitable metals in a finely-divided metallic state may be mixed with the graphite and molded into form. After the collector or block has been molded, as described, it may be electroplated with copper, if desired.

Fig. 1 shows a collector or block in which $a$ represents the graphite and $b$ the finely-divided copper or other metal distributed throughout its mass. In Fig. 2 the block is provided with an electroplated coating $c$ of copper, which serves to increase the strength and electrical conductivity of the block and insures its good electrical contact with the clamp to which it is secured when in use.

Instead of using finely-divided metal distributed throughout the graphite I may use fine wires of copper or other metal molded parallel to each other in the block, so that in use the latter may be secured in the clamp in such manner that these wires will form electrical conductors between the clamp and commutator. This form of collector is illustrated in Fig. 3, the wires being represented by $d$; or instead of using fine wire I may employ rods $e$, either round or square, as illustrated in Fig. 4.

Another modification is shown in Fig. 5, in which $f$ represents alternate plates or sheets of copper or other metal, which may be perforated, if desired, and $a$ represents layers of graphite.

Fig. 6 shows a block composed of several layers of metal gauze around and into which the carbon is pressed. The wires composing the gauze are disposed diagonally, as shown, and thus the wearing away of the block continually presents the ends of these wires at new points on the commutator, thus preventing unequal wearing.

It is evident from the foregoing description that the form and construction of my improved commutator current collector or block may be widely varied, and that the proportions of the mixture or materials and the materials constituting the mixture or the article may also be varied without departing from the invention, and hence I would have it understood that I do not limit the invention to the particular construction of commutator collector or block shown or described, or to the particular proportions or materials herein specified; but, Having fully described my invention, what I claim as new, and desire to secure by Letters Patent, is—

1. A commutator current collector or block consisting of graphite combined with interspersed metal of good electrical conductivity, substantially as and for the purpose specified.

2. A commutator current collector or block consisting of graphite and interspersed metal molded into the desired form, substantially as and for the purpose specified.

3. A commutator current collector or block consisting of graphite having metal of good electrical conductivity distributed throughout its mass, substantially as and for the purpose specified.

4. A commutator current collector or block consisting of graphite and finely-divided metal of good electrical conductivity molded into the desired form, substantially as and for the purpose specified.

5. A commutator current collector or block consisting of graphite and finely-divided copper, substantially as and for the purpose specified.

6. A commutator current collector or block consisting of graphite and metal molded into the desired form and provided with an electroplated coating, substantially as and for the purpose specified.

In testimony whereof I have signed this specification in the presence of two subscribing witnesses.

CHARLES F. BRUSH.

Witnesses:
J. POTTER,
SIDNEY H. SHORT.